United States Patent
Adaniya et al.

(10) Patent No.: US 9,574,560 B2
(45) Date of Patent: Feb. 21, 2017

(54) MOTOR-DRIVEN COMPRESSOR

(71) Applicants: Taku Adaniya, Kariya (JP); Minoru Mera, Kariya (JP); Shinichi Okuyama, Kariya (JP); Tatsuya Horiba, Kariya (JP)

(72) Inventors: Taku Adaniya, Kariya (JP); Minoru Mera, Kariya (JP); Shinichi Okuyama, Kariya (JP); Tatsuya Horiba, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 309 days.

(21) Appl. No.: 14/040,271

(22) Filed: Sep. 27, 2013

(65) Prior Publication Data

US 2014/0093408 A1   Apr. 3, 2014

(30) Foreign Application Priority Data

Oct. 2, 2012  (JP) .................................. 2012-220502
Jul. 23, 2013  (JP) .................................. 2013-152559

(51) Int. Cl.
  *H02K 11/00*  (2016.01)
  *F04C 11/00*  (2006.01)
  (Continued)

(52) U.S. Cl.
  CPC ........... *F04C 11/008* (2013.01); *F04C 23/008* (2013.01); *F04C 29/0085* (2013.01); *H02K 3/50* (2013.01);
  (Continued)

(58) Field of Classification Search
  CPC ... F04C 23/008; F04C 29/0085; F04C 11/008; H02K 3/50
  (Continued)

(56) References Cited

U.S. PATENT DOCUMENTS 4,921,454 A * 5/1990 Atherton .............. H01R 13/652
                                                            439/456
2004/0263010 A1  12/2004 Sato et al.
(Continued)

FOREIGN PATENT DOCUMENTS

CN   102011729 A   4/2011
JP   2006-042409 A  2/2006
(Continued)

OTHER PUBLICATIONS

Communication dated Aug. 5, 2015 from the State Intellectual Property Office of People's Republic of China issued in corresponding Chinese application No. 201310462087.X.

*Primary Examiner* — Devon Kramer
*Assistant Examiner* — Lilya Perkarskaya
(74) *Attorney, Agent, or Firm* — Sughrue Mion, PLLC

(57) ABSTRACT

A motor-driven compressor includes an electric motor, a compression unit, a lead wire, a connection terminal, a cluster block, a housing, a motor drive circuit, a conductive terminal, and a coupling member. The lead wire is extended from a coil end of the stator. The connection terminal is electrically connected to the lead wire. The cluster block accommodates the connection terminal. The conductive terminal electrically connects the connection terminal and the motor drive circuit. The coupling member is arranged between the stator and the cluster block. The cluster block is coupled to the stator by the coupling member. The coupling member is configured to change an coupling position of the cluster block relative to the stator so that the connection terminal faces the conductive terminal.

15 Claims, 7 Drawing Sheets

(51) Int. Cl.
*F04C 23/00* (2006.01)
*F04C 29/00* (2006.01)
*H02K 3/50* (2006.01)
*F04C 18/02* (2006.01)

(52) U.S. Cl.
CPC ........ *F04C 18/0215* (2013.01); *F04C 2240/30* (2013.01); *F04C 2240/803* (2013.01); *F04C 2240/805* (2013.01); *F04C 2240/808* (2013.01); *H02K 2203/06* (2013.01)

(58) Field of Classification Search
USPC .................. 417/410.1, 410.5, 423.7; 310/71
See application file for complete search history.

(56) References Cited

U.S. PATENT DOCUMENTS

| | | | |
|---|---|---|---|
| 2009/0304536 A1 | 12/2009 | Egawa et al. | |
| 2011/0020153 A1* | 1/2011 | Murakami | F04C 23/008 417/410.1 |
| 2011/0058973 A1 | 3/2011 | Yamada et al. | |
| 2013/0142682 A1* | 6/2013 | Watanabe | F04B 39/121 417/423.7 |

FOREIGN PATENT DOCUMENTS

| | | | |
|---|---|---|---|
| JP | 2009-264172 A | | 11/2009 |
| JP | 2010-059809 A | | 3/2010 |
| JP | 2012172543 A | | 9/2012 |
| TW | 200809093 A | | 2/2008 |
| WO | PCT/JP2011/079345 | * | 12/2011 |

* cited by examiner

MOTOR-DRIVEN COMPRESSOR

BACKGROUND OF THE INVENTION

The present invention relates to a motor-driven compressor.

A motor-driven compressor includes a compression unit, which compresses and discharges a refrigerant, an electric motor, which serves as a drive source for the compression unit, and a motor drive circuit, which drives the electric motor. A conductive terminal electrically connects the motor drive circuit and the electric motor, and a lead wire extends from the electric motor. A connection terminal arranged in a cluster block, which is accommodated in a housing, electrically connects the conductive terminal and the lead wire. Japanese Laid-Open Patent Publication No. 2006-42409 describes an example in which the cluster block is coupled to a stator core of the electric motor.

In a motor-integrated compressor (motor-driven compressor) of the above-described publication, a cluster (cluster block) includes a dovetail projection, and a stator core has an outer surface including a dovetail groove extending along the axial direction of the stator core. The dovetail projection is engaged with the dovetail groove by sliding the dovetail projection into the dovetail groove. This couples the cluster to the outer surface of the stator core.

Shrink-fitting is performed to couple the stator core, which is coupled with the cluster, to the interior of the motor housing. After the stator core is shrink-fitted to the interior of the motor housing, the conductive terminal and the connection terminal are connected in the cluster. When the cluster is coupled to the outer surface of the stator core by engaging the dovetail projection and the dovetail groove like in the publication described above, a clearance is formed between the dovetail projection and the dovetail groove. The clearance allows for adjustment of the position of the cluster to a certain extent. Thus, when the stator core is shrink-fitted to the interior of the motor housing, the conductive terminal and the connection terminal may easily be connected in the cluster even when the conductive terminal and the connection terminal are not located at the proper connection positions.

In the publication described above, however, the dovetail groove formed in the outer surface of the stator core to couple the cluster to the stator core inhibits the flow of magnetic flux through the stator. This lowers the torque of the electric motor.

SUMMARY OF THE INVENTION

It is an object of the present invention to provide a motor-driven compressor that allows for a cluster block to be coupled to a stator, suppresses decreases in the torque of the electric motor as much as possible, and facilitates the connection of the conductive terminal and the connection terminal.

To achieve the above object, one aspect of the present invention is a motor-driven compressor including an electric motor, a compression unit, a lead wire, a connection terminal, a cluster block, a housing, a motor drive circuit, a conductive terminal, and a coupling member. The electric motor includes a stator, which includes a stator core and a coil end that projects from the stator core, a rotor, and a rotation shaft, which rotates integrally with the rotor. The compression unit is driven by rotation of the rotation shaft. The lead wire is extended from the coil end. The connection terminal is electrically connected to the lead wire. The cluster block accommodates the connection terminal. The housing accommodates the electric motor, the compression unit, and the cluster block. The motor drive circuit drives the electric motor. The conductive terminal electrically connects the connection terminal and the motor drive circuit. The coupling member is arranged between the stator and the cluster block. The coupling member couples the cluster block to the stator. The coupling member is configured to change a coupling position of the cluster block relative to the stator so that the connection terminal faces the conductive terminal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of a motor-driven compressor will now be described with reference to FIGS. 1 to 5.

Figure 1:
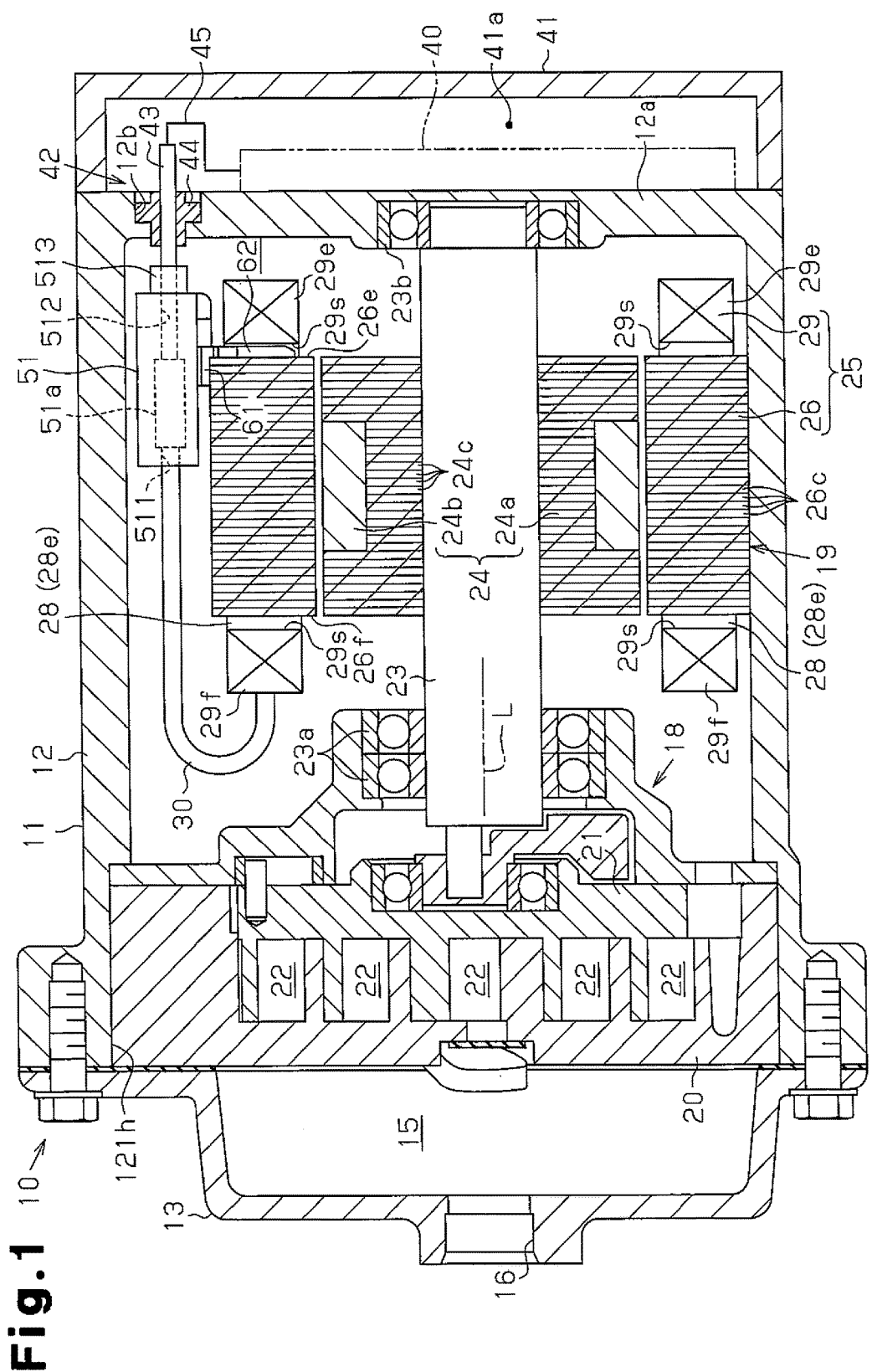
FIG. 1 is a cross-sectional view of a motor-driven compressor according to one embodiment of the present invention.

As shown in FIG. 1, a housing 11 of a motor-driven compressor 10 includes a cylindrical motor housing 12 and a cylindrical discharge housing 13. The motor housing has a closed end and an open end 121h (left end in FIG. 1). The discharge housing 13 is coupled to the open end 121h of the motor housing 12. The closed end of the motor housing 12 forms an end wall 12a coupled to a cylindrical inverter cover 41, which has a closed end. A discharge chamber 15 is formed between the motor housing 12 and the discharge housing 13. A discharge port 16 is formed at one end wall of the discharge housing 13, and an external refrigerant circuit (not shown) is connected to the discharge port 16. An intake port (not shown) is formed in the circumferential wall of the motor housing 12, and the external refrigerant circuit is connected to the intake port.

A rotation shaft 23 is accommodated in the motor housing 12. The rotation shaft 23 is supported to be rotatable in the motor housing 12 by radial bearings 23a and 23b. Further, a compression unit 18, which compresses refrigerant, and an electric motor 19, which drives the compression unit 18, are accommodated in the motor housing 12. Further, the end wall 12a of the motor housing 12 and the inverter cover 41 define an accommodation compartment 41a. In the accommodation compartment 41a, a motor drive circuit 40 (shown with a chain double dashed line in FIG. 1) is coupled to the outer surface of the end wall 12a. Thus, in the present embodiment, the compression unit 18, the electric motor 19, and the motor drive circuit 40 are arranged in order in a direction (axial direction) in which an axis L of the rotation shaft 23 extends.

The compression unit 18 includes a fixed scroll 20, which is fixed in the motor housing 12, and a movable scroll 21, which is engaged with the fixed scroll 20. A compression chamber 22 having a variable displacement is formed between the fixed scroll 20 and the movable scroll 21.

The electric motor 19 is arranged at a portion of the compressor 10 that is relatively close to the end wall 12a (right side of FIG. 1) of the motor housing 12 than the compression unit 18. The electric motor 19 includes a rotor 24, which integrally rotates with the rotation shaft 23, and a stator 25, which is fixed to the inner circumferential surface of the motor housing 12 around the rotor 24.

The rotor 24 includes a cylindrical rotor core 24a, which is coupled to the rotation shaft 23. Permanent magnets 24b are embedded in the rotor core 24a and arranged at equal intervals in the circumferential direction of the rotor core 24a. The rotor core 24a is formed by stacking a plurality of magnetic core plates 24c (electromagnetic steel plates). The stator 25 includes an annular stator core 26, which is fixed to the inner circumferential surface of the motor housing 12, and coils 29, which are arranged on the stator core 26. The stator core 26 is formed by stacking a plurality of magnetic core plates 26c (electromagnetic steel plates).

Figure 2:
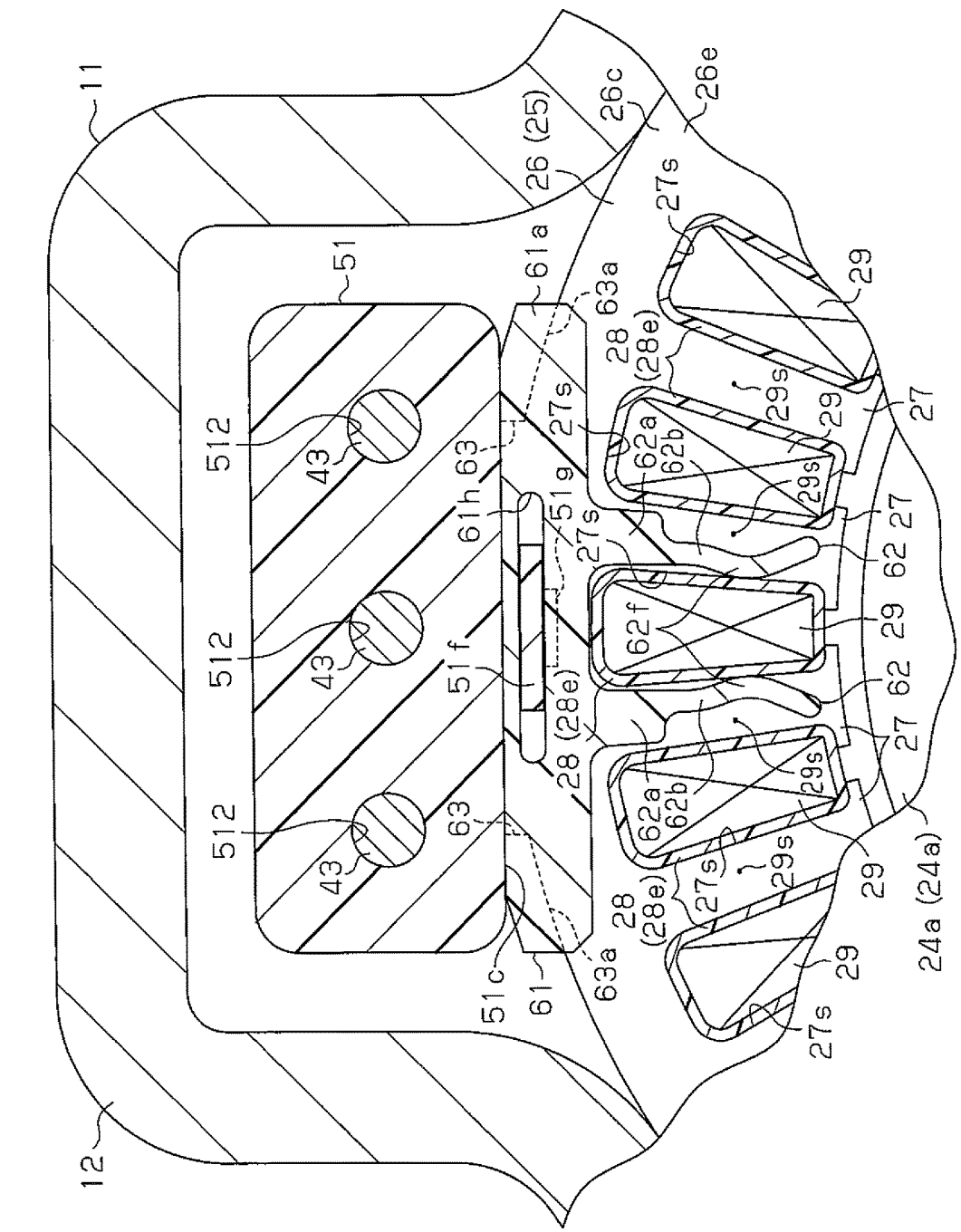
FIG. 2 is a partial cross-sectional view of the motor-driven compressor of FIG. 1.

As shown in FIG. 2, teeth 27 project from an inner circumference of each core plate 26c toward the inner side in the radial direction of the rotation shaft 23. The teeth 27 are arranged at equal intervals in the circumferential direction of the stator core 26. Slots 27s are arranged between adjacent teeth 27 at equal intervals in the circumferential direction of the stator core 26. Coils 29 are wound around the teeth 27 in the slots 27s with tubular insulating sheets 28 arranged between the teeth 27 and the coils 29. The insulating sheets 28 extend along the axial direction of the rotation shaft 23 in the slots 27s and have axial ends projecting out of the two axial end faces 26e and 26f of the stator core 26.

As shown in FIG. 1, a cuff 28e is bent formed at the two ends of each insulating sheet 28. The bent distal end of each cuff 28e is hooked to each of the end faces 26e and 26f of the stator core 26. This prevents displacement of the insulating sheet 28 relative to the stator core 26 in the slot 27s. Each coil 29 of the electric motor 19 includes coil ends 29e and 29f projecting out of the stator core 26. The coil end 29e is located at a portion of the electric motor 19 that is relatively close to the motor drive circuit 40 (one side in the axial direction of the rotation shaft 23) than the stator core 26. The coil end 29f is located at a portion of the electric motor 19 that is relatively close to the compression unit 18 (other side in the axial direction of the rotation shaft 23) than the stator core 26. Lead wires 30 are provided for a U phase, a V phase, and a W phase. The lead wires 30 (only one shown in FIG. 1) each include a starting end drawn out from the coil end 29f located at a portion of the electric motor 19 that is relatively close to the compression unit 18.

As shown in FIGS. 1 and 2, gaps 29s are formed between the end faces 26e and 26f (teeth 27) of the stator core 26 and the corresponding coil ends 29e and 29f in the axial direction of the rotation shaft 23 and between the ends of adjacent insulating sheets 28 in the circumferential direction of the stator core 26. The gaps 29s are voids formed by the coil ends 29e and 29f when the two ends of each insulating sheet 28 project out of the end faces 26e and 26f of the stator core 26. Further, the gaps 29s are arranged in the circumferential direction of the stator core 26. The formation of the gaps 29s ensure insulation between the end faces 26e and 26f of the stator core 26 and the coil ends 29e and 29f.

The end wall 12a of the motor housing 12 includes a through-hole 12b. A sealing terminal 42 is arranged in the through-hole 12b. The sealing terminal 42 includes three conductive terminals 43 (only one shown in FIG. 1) and three glass insulating members 44 (only one shown in FIG. 1). The conductive terminals 43 electrically connect the electric motor 19 and the motor drive circuit 40. The glass insulating members 44 fix the conductive terminals 43 to the end wall 12a while insulating the conductive terminals 43 from the end wall 12a. Each conductive terminal 43 includes a first end electrically connected to the motor drive circuit 40 by a cable 45 and a second end extending into the motor housing 12.

A cluster block 51 is accommodated in the motor housing 12. The cluster block 51 is arranged on the stator core 26 at a portion located at the outer side of the coil end 29e in the radial direction of the rotation shaft 23. A coupling member 61 couples the cluster block 51 to the stator 25. The cluster block 51 accommodates connection terminals 51a electrically connected to the lead wires 30, respectively. Three first insertion holes 511 (only one shown in FIG. 1) are formed in an end face (first end face of the cluster block 51) relatively close to the compression unit 18 in the cluster block 51. A starting end of each lead wire 30 is electrically connected to one of the connection terminals 51a through the corresponding first insertion hole 511. Furthermore, three tubular portions 513 (only one shown in FIG. 1) are formed on an end face (second end face of the cluster block 51) relatively close to the motor drive circuit 40 in the cluster block 51. The cluster block 51 includes second insertion holes 512 that are in communication with the inner side of the corresponding tubular portion 513. The second end of each conductive terminal 43 is electrically connected to one of the connection terminals 51a through the corresponding tubular portion 513 and the corresponding second insertion hole 512.

Figure 3:
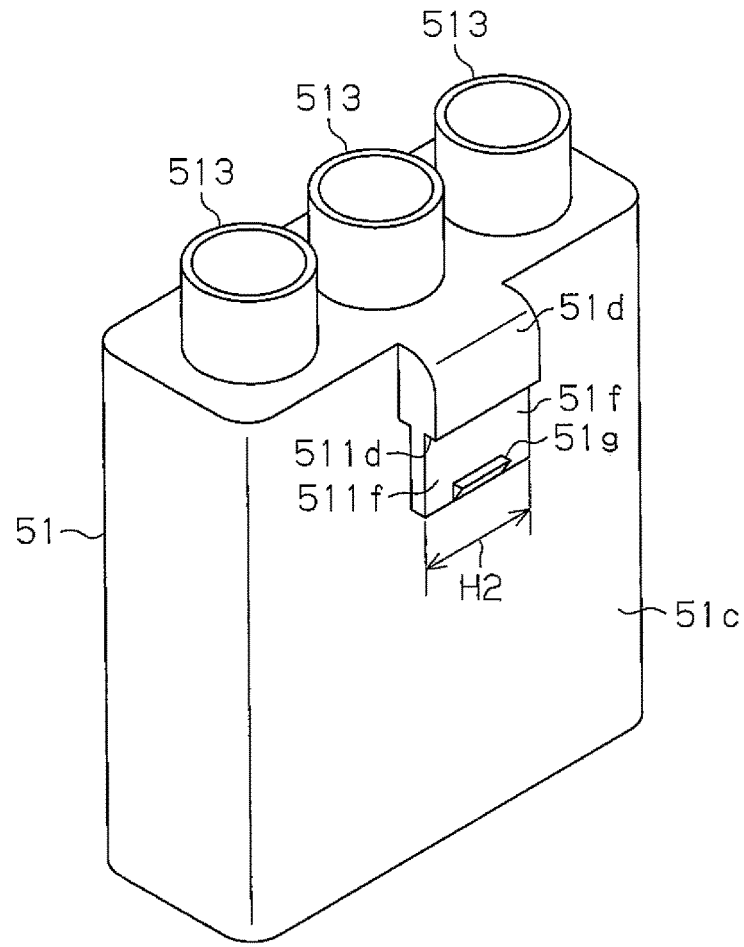
FIG. 3 is a perspective view of a cluster block shown in FIG. 2.

As shown in FIG. 3, the cluster block 51 has the shape of a square box with a low profile. The cluster block 51 has a lower surface 51c including a bulging portion 51d that bulges downward and is continuous with the end face of the cluster block 51 that faces the motor drive circuit 40. The bulging portion 51d includes an end face 511d (first end face of the bulging portion 51d) relatively close to the compression unit 18. The end face 511d includes a plate-shaped insertion portion 51f that is parallel to the lower surface 51c of the cluster block 51 and extends in the extending direction of the conductive terminals 43. The insertion portion 51f has a lower surface 511f with a distal end that includes a hooking portion 51g that projects downward from the lower surface 511f of the insertion portion 51f.

Figure 4:
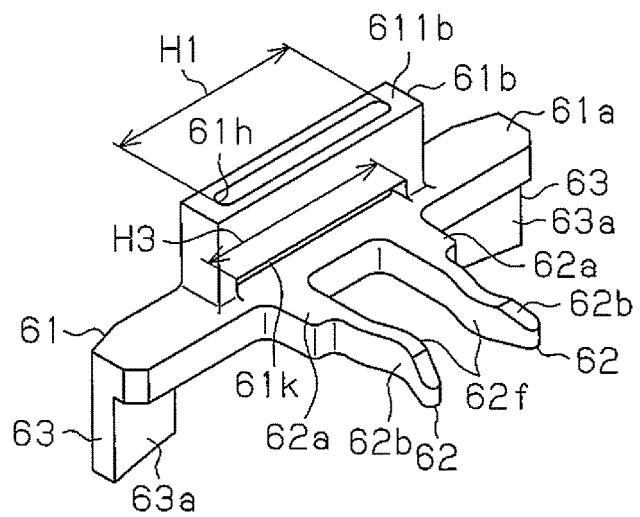
FIG. 4 is a perspective view of a coupling member shown in FIG. 2.

As shown in FIG. 4, the coupling member 61 includes a plate-shaped main body 61a. The main body 61a has an end face (first end face) relatively close to the motor drive circuit 40 including a projection 61b. The projection 61b includes an insertion hole 61h, which serves as a receiving portion into which the insertion portion 51f is inserted. The insertion hole 61h has a rectangular shape. Two inserting projection pieces 62 project downward (toward the inner side in the radial direction of the rotation shaft 23) from the lower side of the main body 61a. Further, the main body 61a includes two plate-shaped contact portions 63 projecting toward the compression unit 18 from an end face (second end face of the main body 61a) that is relatively close to the compression unit 18.

The insertion hole 61h has a width H1 in the longitudinal direction that is greater than a width H2 of the insertion portion 51f. A cutout 61k, which extends in the longitudinal direction of the insertion hole 61h, is formed at a boundary of the projection 61b and the end face of the main body 61a that is relatively close to the motor drive circuit 40. The cutout 61k has a width H3 in the longitudinal direction that is greater than the width H2 of the insertion portion 51f. The interior of the cutout 61k is in communication with the insertion hole 61h.

Each inserting projection piece 62 has a basal portion 62a, which is continuous with the lower side of the main body 61a, and distal portion 62b, which is continuous with the basal portion 62a and further elongated than the basal portion 62a. The basal portions 62a are separated by a distance conforming to the width of the coil 29 and the insulating sheet 28 in each slot 27s. The basal portion 62a has a thickness allowing for insertion between adjacent insulating sheets 28 in the circumferential direction of the stator core 26. Thus, the two inserting projection pieces 62 can be inserted into the corresponding gaps 29s. The two distal portions 62b, which extend from the basal portions 62a, may be moved toward or away from each other. Each distal portion 62b includes an engagement section 62f. The engagement sections 62f of the two distal portions 62b are bent toward each other. Each contact portion 63 includes a lower surface 63a that is arcuate to extend along the outer circumferential surface of the stator core 26.

Figure 5:
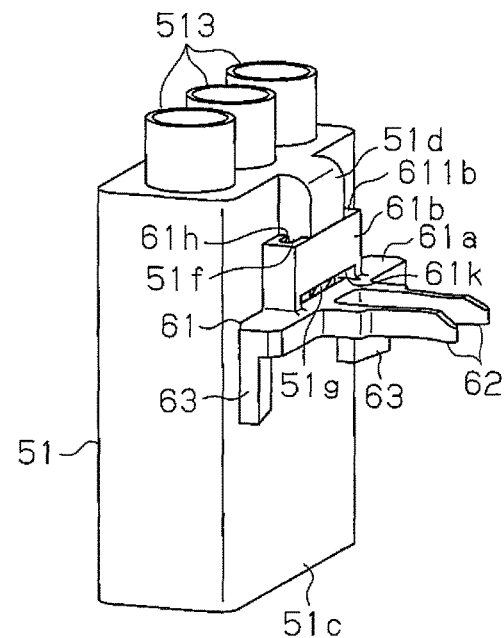
FIG. 5 is a perspective view showing the cluster block and the coupling member of FIGS. 3 and 4 coupled to each other.

As shown in FIG. 5, the cluster block 51 and the coupling member 61 are coupled to each other by inserting the insertion portion 51f into the insertion hole 61h. When the cluster block 51 and the coupling member 61 are coupled, the end face 511d of the bulging portion 51d that is relatively close to the compression unit 18 faces an end face 611b of the projection 61b that is relatively close to the motor drive circuit 40. Further, the hooking portion 51g projects from the insertion hole 61h into the cutout 61k in the radial direction of the rotation shaft 23. This hooks the hooking portion 51g to the projection 61b (coupling member 61) and rigidly couples the cluster block 51 and the coupling member 61. The insertion portion 51f is movable in the insertion hole 61h along the longitudinal direction of the insertion hole 61h (direction orthogonal to the extending direction of the conductive terminals 43).

As shown in FIG. 2, when the two inserting projection pieces 62 are inserted into the corresponding gaps 29s from the outer circumferential side of the coil ends 29e in the radial direction of the rotation shaft 23, the engagement sections 62f come into contact with the corresponding insulating sheet 28. This moves the distal portions 62b away from each other. When inserting the inserting projection pieces 62 into the gaps 29s, the distal portions 62b act to move toward each other. In other words, the distal portions 62b act to return to their original positions. As a result, the corresponding insulating sheet 28 and the coil 29 are held between the engagement sections 62f. This holds the engagement sections 62f with the insulating sheet 28, and couples the cluster block 51 to the stator 25 with the coupling member 61.

The engagement of the engagement sections 62f with the insulating sheet 28 prevents removal of the two inserting projection pieces 62 from the coil end 29e toward the outer circumferential side (radially outer side). Movement of the coupling member 61 in the axial direction of the rotation shaft 23 relative to the stator 25 is restricted by the contact of the two inserting projection pieces 62 with the end face 26e of the stator core 26, the contact of the main body 61a of the coupling member 61 with the end face 26e of the stator core 26, and the contact of the two inserting projection pieces 62 with the coil end 29e. Further, movement of the coupling member 61 in the circumferential direction of the stator core 26 relative to the stator 25 is restricted by the contact of the basal portions 62a in the adjacent insulating sheets 28.

When the cluster block 51 is coupled to the stator 25 by the coupling member 61, the lower surface 63a of each contact portion 63 comes into contact with the outer circumferential surface of the stator core 26. The contact of the lower surface 63a of each contact portion 63 with the outer circumferential surface of the stator core 26 maintains the position of the cluster block 51 relative to the stator 25. In this manner, in the present embodiment, each contact portion 63 serves as a maintaining portion that maintains the position of the cluster block 51 relative to the stator 25.

The operation of the present embodiment will now be described.

The two inserting projection pieces 62 of the coupling member 61 are inserted to the gaps 29s between the end face 26e of the stator core 26, which is relatively close to the motor drive circuit 40, and the coil end 29e at the outer circumferential side of the coil end 29e in the radial direction of the rotation shaft 23. The cluster block 51 is coupled to the portion of the stator 25 at the outer circumferential side of the coil end 29e in the radial direction of the rotation shaft 23. The outer circumferential surface of the stator core 26 does not includes a dovetail groove that couples the cluster block 51 to the stator core 26 like in the prior art. Therefore, the coupling of the cluster block 51 does not affect the flow of magnetic flux flowing through the stator core 26.

When the cluster block 51 is coupled to the stator 25 by the coupling member 61, the stator core 26 is coupled to the interior of the motor housing 12 through shrink-fitting. After the stator core 26 is shrink-fit to the interior of the motor housing 12, the conductive terminals 43 and the connection terminals 51a are connected. In this case, the coupling position of the cluster block 51 relative to the stator 25 can be changed by moving the insertion portion 51f in the insertion hole 61h. Thus, even when the connection positions of the conductive terminals 43 and the connection terminals 51a are displaced, the coupling position of the cluster block 51 may be adjusted so that the connection terminals 51a are aligned with the conductive terminals 43. This facilitates the connection of the conductive terminals 43 and the connection terminals 51a.

The end face 511d of the bulging portion 51d, which is relatively close to the compression unit 18, faces the end face 611b of the projection 61b, which is relatively close to the motor drive circuit 40. Thus, the load applied to the cluster block 51 when connecting the conductive terminals 43 and the connection terminals 51a is received by contact of the end face 511d of the bulging portion 51d with the end face 611b of the projection 61b. When connecting the conductive terminal 43 and the connection terminal 51a, this suppresses movement of the cluster block 51 toward the compression unit 18 relative to the stator 25.

The power controlled by the motor drive circuit 40 is supplied to the electric motor 19 through the cable 45, the conductive terminals 43, the connection terminals 51a, and the lead wires 30. This rotates the rotation shaft 23 together with the rotor 24 at a controlled rotation speed and drives the compression unit 18. The driven compression unit 18 draws refrigerant from the external refrigerant circuit into the motor housing 12 through the intake port, compresses the refrigerant drawn into the motor housing 12 with the compression unit 18, and discharges the compressed refrigerant from the discharge port 16 into the external refrigerant circuit.

The above embodiment has the advantages described below.

(1) The cluster block 51 is coupled to the stator 25 by the coupling member 61 that allows for the coupling position of the cluster block 51 to be changed relative to the stator 25. The coupling position of the cluster block 51 is adjusted so that the connection terminals 51a are aligned with the conductive terminals 43. Thus, even when the connecting positions of the conductive terminals 43 and the connection terminals 51a are displaced when the stator core 26 is shrink-fit to the interior of the motor housing 12, the conductive terminals 43 may be connected to the connection terminals 51a. Thus, there is no need to adjust the coupling position of the cluster block 51 using a dovetail groove, which inhibits the flow of magnetic flux, formed in the outer circumferential surface of the stator core 26 like in the prior art. As a result, the cluster block 51 is coupled to the stator 25, decreases in the torque of the electric motor 19 are suppressed as much as possible, and the connection of the conductive terminals 43 and the connection terminals 51a is facilitated.

(2) The cluster block 51 is discrete from the coupling member 61. This facilitates adjustment of the coupling position of the cluster block 51 compared to, for example, when the cluster block 51 and the coupling member 61 are integrally formed through a portion having elastic properties.

(3) The cluster block 51 includes the insertion portion 51f, and the coupling member 61 includes the insertion hole 61h, into which the insertion portion 51f is inserted. Accordingly, the cluster block 51 and the coupling member 61 are coupled by simply inserting the insertion portion 51f into the insertion hole 61h.

(4) The insertion portion 51f includes the hooking portion 51g. The hooking of the hooking portion 51g to the projection 61b reinforces the coupling of the cluster block 51 and the coupling member 61.

(5) The contact of the lower surface 63a of each contact portion 63 with the outer circumferential surface of the stator core 26 maintains the position of the cluster block 51 relative to the stator 25. This further facilitates the connection of the conductive terminals 43 and the connection terminals 51a.

(6) The coupling member 61 includes the two inserting projection pieces 62. Thus, the cluster block 51 may be coupled to the stator 25 by simply inserting the two inserting projection pieces 62 into the gaps 29s. Thus, there is no need for performing machining to couple the cluster block 51 to the stator core 26, and interference is reduced in the magnetic flux flowing through the stator core 26.

(7) The inserting projection piece 62 includes the engagement section 62f. Engagement of the engagement section 62f with the insulating sheet 28 prevents separation of the inserting projection piece 62 from the gap 29s.

(8) The coupling member 61 includes the two inserting projection pieces 62 that are inserted to the corresponding gaps 29s to couple the cluster block 51 to the stator 25 with the coupling member 61. This reinforces the coupling of the cluster block 51 relative to the stator 25 as compared to when the coupling member 61 includes only one inserting projection piece that is inserted into the gap 29s to couple the cluster block 51 to the stator 25 with the coupling member 61.

(9) The conductive terminals 43 are fixed to the end wall 12a of the motor housing 12. This sets the positions of the conductive terminals 43. Thus, the adjustment of the coupling position of the cluster block 51 allows for easy connection of the conductive terminals 43 and the connection terminals 51a.

(10) The motor-driven compressor 10 of the present embodiment includes the compression unit 18, the electric motor 19, and the motor drive circuit 40 arranged in order in the axial direction of the rotation shaft 23. The lead wires 30 are extended from the portion of the electric motor 19 that is relatively close to the compression unit 18. Thus, in the illustrated example, the electric motor 19 and the motor drive circuit 40 do not need to be electrically connected by wires in a narrow space between the end face 26e of the stator core 26 and the end wall 12a of the motor housing 12. That is, in the motor-driven compressor 10 in which the compression unit 18, the electric motor 19, and the motor drive circuit 40 are arranged in series in this order, wires are simply connected by connecting the conductive terminals 43 to the connection terminals 51a in the cluster block 51. This increases efficiency when assembling the motor-driven compressor 10. Further, when the cluster block 51 is coupled to the stator 25, the sealing terminal 42 is arranged in the through-hole 12b to electrically connect the conductive terminals 43 and the connection terminals 51a. Thus, the sealing terminal 42 is coupled to the through-hole 12b at the same time as when the conductive terminals 43 are coupled to the connection terminal 51a.

(11) The inserting projection pieces 62 are inserted to the gaps 29s formed between the end face 26e of the stator core 26 that is relatively close to the motor drive circuit 40 and the coil end 29e in the axial direction of the rotation shaft 23. The gap 29s is used to ensure the insulation between the end face 26e of the stator core 26 and the coil end 29e. Thus, there is no need for additional space to insert the inserting projection pieces 62 into the coil end 29e. The coupling member 61 couples the cluster block 51 to the stator 25 by inserting the inserting projection pieces 62 into the conventionally existing gap 29s between the end face 26e that is relatively close to the motor drive circuit 40 of the stator core 26 and the coil end 29e.

(12) The end face 511d of the bulging portion 51d that is relatively close to the compression unit 18 faces the end face 611b of the projection 61b that is relatively close to the motor drive circuit 40. Thus, the load applied to the cluster block 51 when connecting the conductive terminal 43 and the connection terminal 51a is received by contact of the end face 511d of the bulging portion 51d with the end face 611b of the projection 61b. This suppresses movement of the cluster block 51 toward the compression unit 18 relative to the stator 25 when connecting the conductive terminal 43 and the connection terminal 51a.

It should be apparent to those skilled in the art that the present invention may be embodied in many other specific forms without departing from the spirit or scope of the invention. Particularly, it should be understood that the present invention may be embodied in the following forms.

Figure 6A:
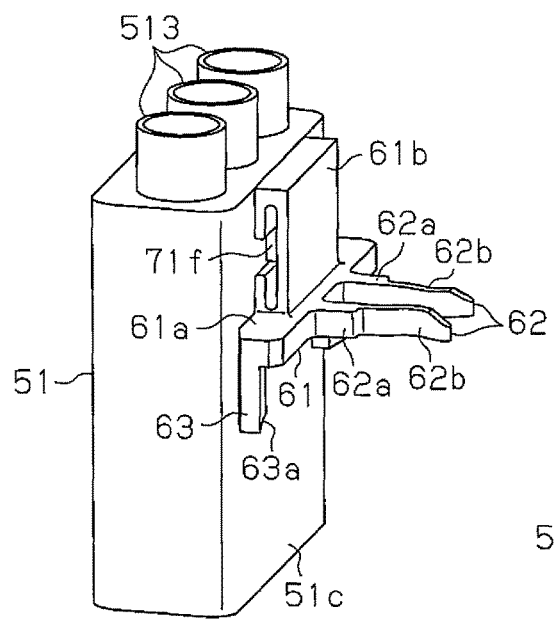
FIG. 6A is a perspective view showing a cluster block and a coupling member coupled to each other in another embodiment.
Figure 6B:
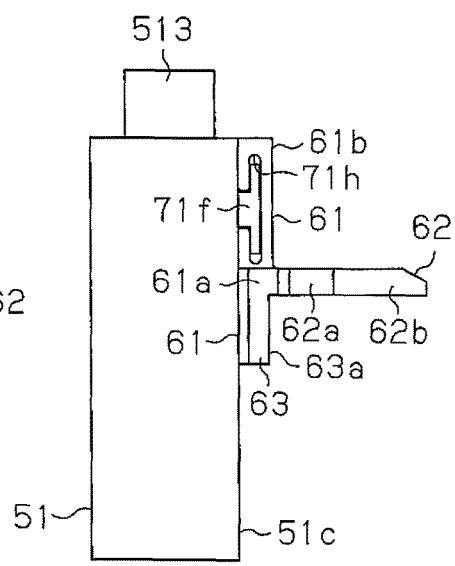
FIG. 6B is a side view showing the cluster block and the coupling member of FIG. 6A coupled to each other.

As shown in FIGS. 6A and 6B, the cluster block 51 includes a T-shaped insertion portion 71f, which projects from the lower surface 51c of the cluster block 51. Further, the projection 61b of the coupling member 61 includes an insertion groove 71h serving as a receiving portion that receives the insertion portion 71f in a direction orthogonal to the extending direction of the conductive terminals 43. The coupling member 61 may be coupled to the cluster block 51 by sliding the insertion portion 71f into the insertion groove 71h in the direction orthogonal to the extending direction of the conductive terminal 43. The insertion portion 71f is movable in the direction orthogonal to the extending direction of the conductive terminals 43 in the insertion groove 71h. The coupling position of the cluster block 51 relative to the stator 25 may be changed by sliding the insertion portion 71f in the insertion groove 71h.

Figure 7:
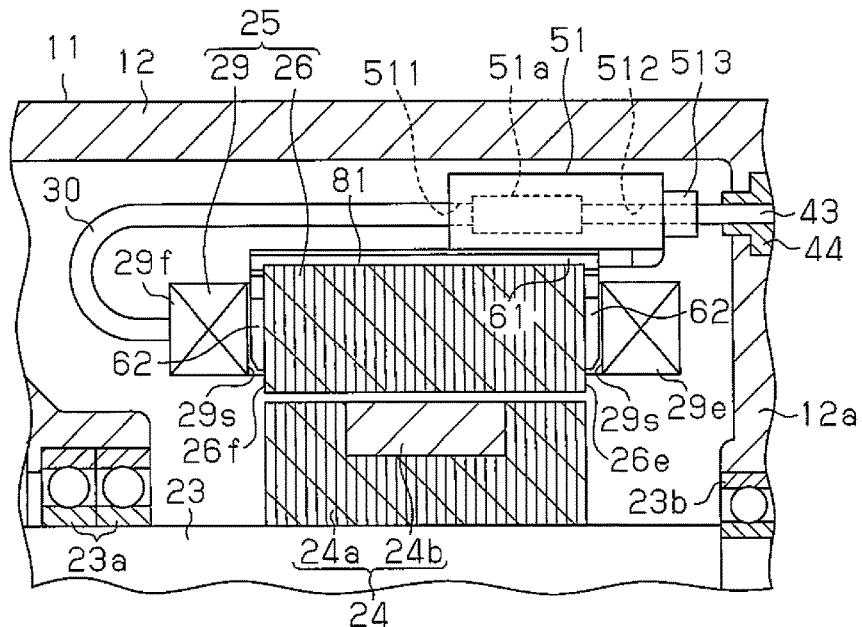
FIG. 7 is a partial cross-sectional view of a motor-driven compressor in a further embodiment.

In the above embodiment, at least one of the inserting projection pieces 62 may be inserted to the gap 29s formed by the coil end 29e (first coil end) located at the portion of the electric motor 19 that is closes to the motor drive circuit 40 than the stator core 26, and at least one of the inserting projection pieces 62 may be inserted into the gap 29s formed by the coil end 29f (second coil end) located at the portion of the electric motor 19 that is closer to the compression unit 18 than the stator core 26. For example, as shown in FIG. 7, an extending portion 81 is formed on the coupling member 61. The extending portion 81 extends between the coil end 29e and the coil end 29f along the axial direction of the rotation shaft 23. The inserting projection piece 62 inserted into the gap 29s formed by the coil end 29e located at the portion of the electric motor 19 that is relatively close to the motor drive circuit 40 is formed at the portion that is relatively close to the motor drive circuit 40 in the extending portion 81. The inserting projection piece 62 inserted into the gap 29s formed by the coil end 29f located at the portion of the electric motor 19 that is relatively close to the compression unit 18 is formed at the portion that is relatively close to the compression unit 18 in the extending portion 81. When the two inserting projection pieces 62 are inserted into the corresponding gaps 29s, the cluster block 51 is coupled to the stator 25 by the coupling member 61. This easily suppresses displacement of the cluster block 51 in the axial direction of the rotation shaft 23.

Figure 8:
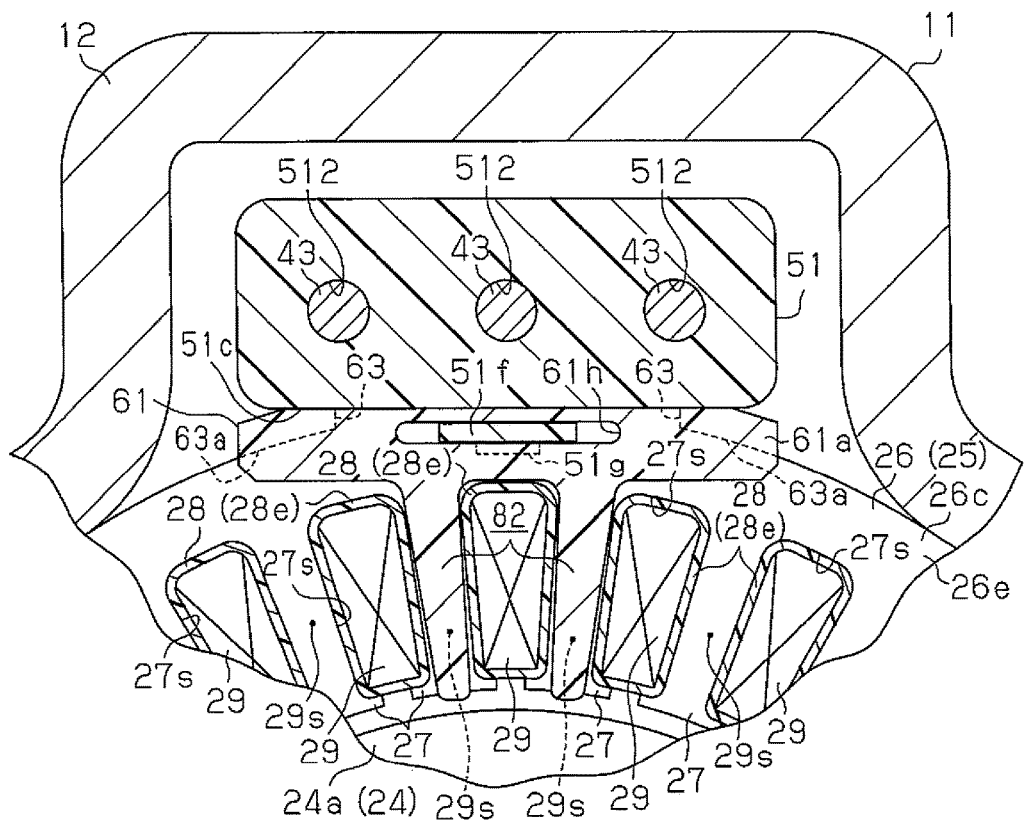
FIG. 8 is a partial cross-sectional view of a motor-driven compressor in a further embodiment.

In the present embodiment, the engagement section 62f may be omitted from each inserting projection piece 62. For example, as shown in FIG. 8, the two inserting projection pieces 82 may each be tapered toward the distal end at the lower side of the main body 61a. The cluster block 51 may be coupled to the stator 25 with the coupling member 61 by inserting the two inserting projection pieces 82 into the gaps 29s.

Figure 9:
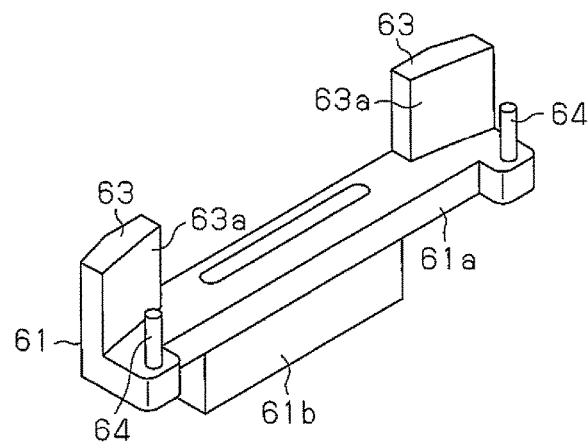
FIG. 9 is a perspective view of a coupling member in a further embodiment.
Figure 10:
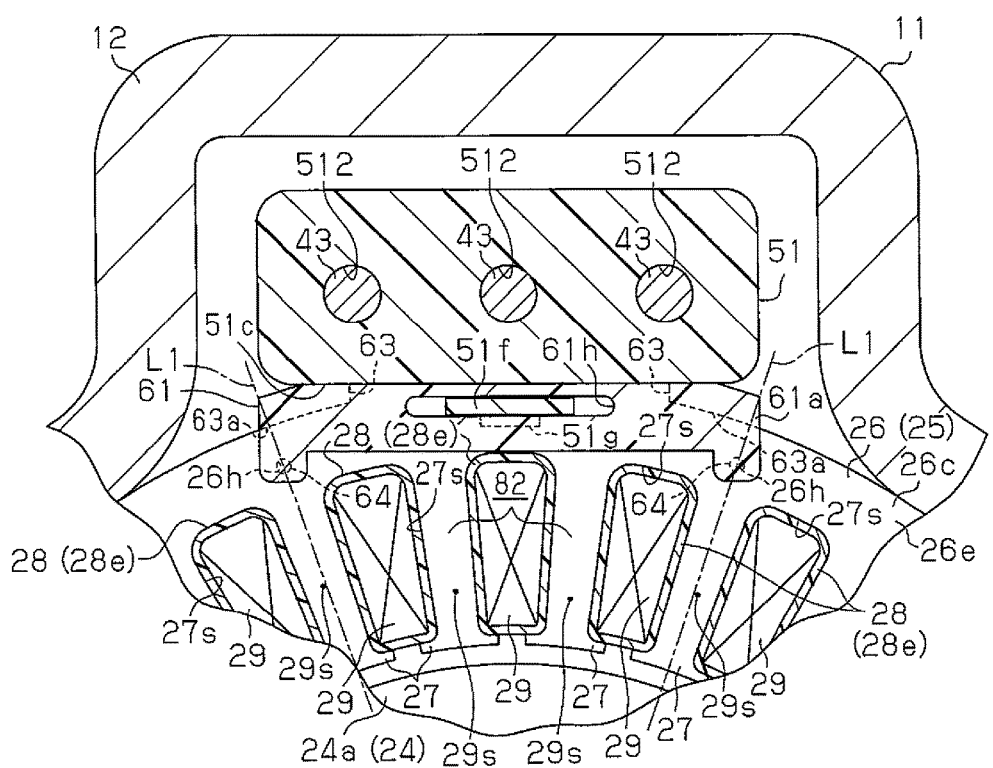
FIG. 10 is a partial cross-sectional view of a motor-driven compressor in the embodiment shown in FIG. 9.

As shown in FIGS. 9 and 10, the coupling member 61 may include two protrusions 64, and the end face 26e of the stator core 26 may include recesses 26h, which receive the protrusions 64. The coupling member 61 couples the cluster block 51 to the stator core 26 by inserting the protrusions 64 into the corresponding recesses 26h. Each protrusion 64 is rod-shaped and projects straight from the end face (second end face of the main body 61a) that is relatively close to the compression unit 18 in the main body 61a of the coupling member 61. Each recess 26h has the shape of a circular hole as viewed from above and is formed at a location lying along a widthwise center line L1 of one of the teeth 27. In other words, each recess 26h is formed at a location where the magnetic field generated in a tooth 27 (stator core 26) is divided into two on the outer circumferential side of the stator core 26 and the magnetic flux is less likely to saturate in the stator core 26 (low magnetic flux density). This minimizes interference to the flow of magnetic flux. Accordingly, the cluster block 51 may be coupled to the stator core 26 with the coupling member 61 by simply inserting the protrusions 64 into the corresponding recesses 26h. The interference of the flow of magnetic flux through the stator core 26 may thus be reduced as compared to when a dovetail groove is formed on the outer circumferential surface of the stator core 26 like in the prior art. The two protrusions may be formed on the end face 26e of the stator core 26, and the recesses, into which the protrusions are inserted, may be formed on the coupling member 61. The cluster block 51 is coupled to the stator core 26 with the coupling member 61 by inserting the two protrusions to the corresponding recesses.

Figure 11:
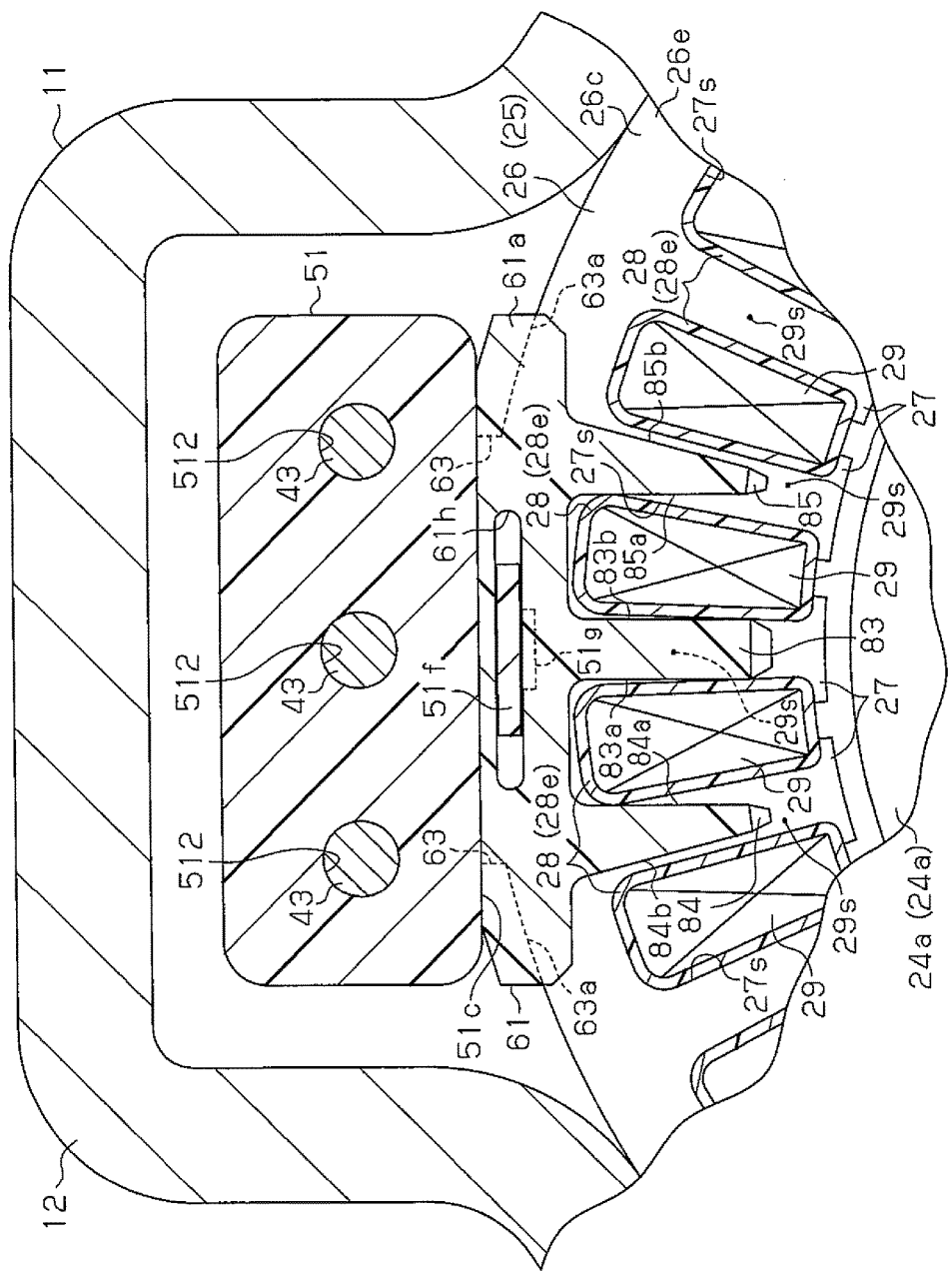
FIG. 11 is a partial cross-sectional view of a motor-driven compressor in a further embodiment.

As shown in FIG. 11, a central projecting piece 83 and a two outer projecting pieces 84 and 85 may be arranged on the lower side of the main body 61a of the coupling member 61. The central projecting piece 83 is inserted into and fitted to the gap 29s. The two outer projecting pieces 84 and 85 are arranged on the two opposite sides of the central projecting piece 83. The two outer projecting pieces 84 and 85 are inserted into two gaps 29s located at opposite sides of the gap 29s into which the central projecting piece 83 is inserted. In this structure, the central projecting piece 83 and the two outer projecting pieces 84 and 85 function as the inserting projection piece. The central projecting piece 83 extends in a direction orthogonal to the lower side of the main body 61a. The central projecting piece 83 and the outer projecting piece 84 include opposing surfaces 83a and 84a facing each other and extending parallel to each other from the basal end toward the distal end. The opposing surfaces 83b and 85a face each other in the central projecting piece 83 and the outer projecting piece 85 extend parallel to each other from the basal end toward the distal end. Thus, each of the opposing surfaces 83a, 83b, 84a, and 85a extends in a direction orthogonal to the lower side of the main body 61a. Outer side surfaces 84b and 85b located on the opposite to the central projecting piece 83 in each of the outer projecting pieces 84 and 85 extend toward the central projecting piece 83 from the basal end to the distal end. Thus, each of the outer projecting pieces 84 and 85 has a tapered shape that inclines toward the central projecting piece 83 from the basal end toward the distal end. The thickness of the central projecting piece 83 is greater than the thickness of each of the outer projecting pieces 84 and 85. The central projecting piece 83 is set to have a thickness allowing the central projecting piece 83 to be press-fitted and fixed between the adjacent insulating sheets 28 in the gap 29s.

Accordingly, the coupling of the cluster block 51 to the stator 25 is reinforced compared to when one or two inserting projection pieces are arranged on the main body 61a of the coupling member 61 and inserted into the gaps 29s to couple the cluster block 51 to the stator 25 with the coupling member 61. Further, the opposing surfaces 83a, 83b, 84a, and 85a face each other in the central projecting piece 83, and the outer projecting pieces 84 and 85 extend parallel to each other from the basal end toward the distal end. The outer side surfaces 84b and 85b located on opposite sides of the central projecting piece 83 in each of the outer projecting pieces 84 and 85 extend toward the central projecting piece 83 from the basal end toward the distal end.

The central projecting piece 83 and the outer projecting pieces 84 and 85 of such a structure can be easily inserted into the gaps 29s arranged in the circumferential direction of the stator core 26. Movement of the coupling member 61 along the circumferential direction of the stator core 26 relative to the stator 25 may be restricted by inserting the outer projecting pieces 84 and 85 into the corresponding gaps 29s. The thickness of the central projecting piece 83 is greater than the thickness of each of the outer projecting pieces 84 and 85. The load applied to the cluster block 51 when connecting the conductive terminal 43 and the connection terminal 51a may be easily received compared to when the thickness of the central projecting piece 83 is thinner than the thickness of each of the outer projecting pieces 84 and 85. The central projecting piece 83 is set to have a thickness that can be press-fitted and fixed between the adjacent insulating sheets 28 in the gap 29s. This prevents separation of the central projecting piece 83 from the gap 29s, and separation of the coupling member 61 from the stator 25.

In the above embodiment, the insertion portion may be arranged on the coupling member 61, and the receiving portion that receives the insertion portion may be arranged in the cluster block 51. Further, the hooking portion may be formed on the insertion portion, and the hooking portion may be hooked to the cluster block 51.

In the above embodiment, the hooking portion 51g may be omitted from the insertion portion 51f.

In the above embodiment, each contact portion 63 may be omitted.

In the above embodiment, the gap into which the inserting projection piece 62 is inserted may be formed by the coil end 29e, and may be any space as long as it allows for the cluster block 51 to be coupled to the stator 25 by the coupling member 61 when the inserting projection piece 62 is inserted.

In the above embodiment, the number of inserting projection pieces 62 is not particularly limited.

In the above embodiment, for example, the engagement section 62f may be held on to the coil 29 as long as the engagement section 62f is held on the stator 25.

In the above embodiment, for example, the cluster block 51 and the coupling member 61 may be integrally formed through a portion having an elastic property. In this case, the coupling position of the cluster block 51 relative to the stator 25 may be changed when the portion having an elastic property is elastically deformed. Accordingly, the cluster block 51 and the coupling member 61 may be formed with a single die. Thus, the manufacturing of the cluster block 51 and the coupling member 61 is facilitated compared to when the cluster block 51 and the coupling member 61 are discrete.

In the above embodiment, the cluster block 51 may be arranged on the inner circumferential side of the coil end 29e in the radial direction of the rotation shaft 23 and coupled to the stator 25 by inserting the pair of inserting projection pieces 62 to each gap 29s from the inner circumferential side of the coil end 29e in the radial direction of the rotation shaft 23.

In the above embodiment, the compression unit 18, the electric motor 19, and the motor drive circuit 40 do not have to be arranged in order in the axial direction of the rotation shaft 23. For example, the inverter cover 41 may be fixed to the circumferential wall of the motor housing 12, and the motor drive circuit 40 may be accommodated in the accommodation compartment defined by the circumferential wall of the motor housing 12 and the inverter cover 41.

In the above embodiment, the compression unit 18 may be of, for example, a piston type, vane type, and the like.

The present examples and embodiments are to be considered as illustrative and not restrictive, and the invention is not to be limited to the details given herein, but may be modified within the scope and equivalence of the appended claims.

What is claimed is:

1. A motor-driven compressor comprising:
   an electric motor including a stator, which includes a stator core and two coil ends that project from opposite two end faces of the stator core, a rotor, and a rotation shaft, which rotates integrally with the rotor;
   a compression unit driven by rotation of the rotation shaft;
   a lead wire extended from the coil end;
   a connection terminal electrically connected to the lead wire;
   a cluster block that accommodates the connection terminal;
   a housing that accommodates the electric motor, the compression unit, and the cluster block;
   a motor drive circuit that drives the electric motor;
   a conductive terminal that electrically connects the connection terminal and the motor drive circuit; and
   a coupling member arranged between the stator and the cluster block, wherein the coupling member couples the cluster block to the stator,
   wherein, upon the cluster block being coupled to the stator by the coupling member, the cluster block is movable with respect to the coupling member so that the connection terminal faces the conductive terminal,
   the compression unit, the electric motor, and the motor drive circuit are arranged in order in an axial direction of the rotation shaft,
   one of the cluster block and the coupling member includes an insertion portion, and the other one of the cluster block and the coupling member includes a receiving portion into which the insertion portion is inserted, and
   the cluster block and the coupling member are coupled together by inserting the insertion portion into the receiving portion in an axial direction of the rotation shaft.

2. The motor-driven compressor according to claim 1, wherein the cluster block is discrete from the coupling member.

3. The motor-driven compressor according to claim 2, wherein the insertion portion of one of the cluster block and the coupling member includes a hooking portion hooked to the other one of the cluster block and the coupling member.

4. The motor-driven compressor according to claim 1, wherein the coupling member includes a maintaining portion that contacts the stator and maintains the cluster block at the same position.

5. The motor-driven compressor according to claim 1, wherein
   the coupling member includes an inserting projection piece; and
   the cluster block is coupled to the stator by inserting the inserting projection piece into a gap formed between an end face of the stator core and the coil end that projects from the stator core.

6. The motor-driven compressor according to claim 5, wherein the inserting projection piece includes an engagement section that is engagable with the stator.

7. The motor-driven compressor according to claim 5, wherein the inserting projection piece is one of a plurality of inserting projection pieces;

the gap is one of a plurality of gaps; and the inserting projection pieces are respectively inserted to the gaps.

8. The motor-driven compressor according to claim 7, wherein the coil end is one of a first coil end located at a first end in an axial direction of the rotation shaft and a second coil end located at a second end in the axial direction; and at least one of the inserting projection pieces is inserted into the gap formed by the first coil end, and at least another one of the inserting projection pieces is inserted into the gap formed by the second coil end.

9. The motor-driven compressor according to claim 7, wherein the gaps are arranged in a circumferential direction of the stator core;

the inserting projection pieces include at least a central projecting piece and two outer projecting pieces;

the central projecting piece is inserted and fitted into one of the gaps;

the two outer projecting pieces are arranged on opposite sides of the central projecting piece and are inserted into gaps arranged on opposite sides of the gap into which the central projecting piece is inserted;

the central projecting piece and the two outer projecting pieces include opposing surfaces opposing one another and extending parallel to one another from a basal end toward a distal end;

each of the two outer projecting pieces includes an outer side surface located opposite to the central projecting piece, and the outer side surface extends toward the central projecting piece from the basal end toward the distal end; and the central projecting piece is thicker than each of the two outer projecting pieces.

10. The motor-driven compressor according to claim 5, wherein the gap is located between the coil end and the end face of the stator core in an axial direction of the rotation shaft.

11. The motor-driven compressor according to claim 1, wherein one of the stator and the coupling member includes a protrusion, and the other one of the stator and the coupling member includes a recess into which the protrusion is inserted; and the cluster block is coupled to the stator by inserting the protrusion into the recess.

12. The motor-driven compressor according to claim 1, wherein the conductive terminal is fixed to the housing.

13. The motor-driven compressor according to claim 1, wherein the lead wire is extended from one of the coil ends of the electric motor that faces the compression unit.

14. The motor-driven compressor according to claim 1, wherein a portion of the cluster block is located at an outer circumferential side of the coil end in a radial direction of the rotation shaft.

15. The motor-driven compressor according to claim 1, wherein the conductive terminal extends along the axial direction of the rotation shaft.

* * * * *